Figure 1:
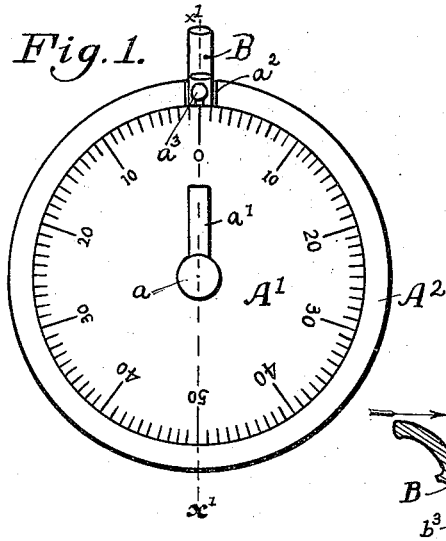

W. T. BENHAM.
DIAL FOR COMBINATION LOCKS.
APPLICATION FILED MAR. 8, 1915.

1,156,659.

Patented Oct. 12, 1915.

WITNESSES:

INVENTOR.
William T. Benham
BY
Walter A. Knight
ATTORNEY.

UNITED STATES PATENT OFFICE.

WILLIAM T. BENHAM, OF NORWOOD, OHIO.

DIAL FOR COMBINATION-LOCKS.

1,156,659.  Specification of Letters Patent.  Patented Oct. 12, 1915.

Application filed March 8, 1915. Serial No. 12,910.

*To all whom it may concern:*

Be it known that I, WILLIAM T. BENHAM, a citizen of the United States, residing at Norwood, in the county of Hamilton and State of Ohio, have invented new and useful Improvements in Dials for Combination-Locks, of which the following is a specification.

My improvements relate to dials for combination locks, such as are used on safes, cabinets and the like; and may be employed with such dials already in use; and any combination lock so equipped can easily be run, in dim light or absolute darkness, by one who knows the combination. The additional cost will be moderate, and the scope of use for combination locks with their manifest advantages, will be greatly extended,—as for example, to doors of garages, store-rooms, file rooms, etc. These improvements may be placed upon the back of the dial as shown in the drawings, or they may be put upon the front. In the preferred form, the graduations are upon the inner face of the dial and the indicator is within the chamber of the dial casing, concealed by the dial, where they can not be readily tampered with or clogged with dirt.

My improvements embody fundamentally a rotatable dial having suitable gage graduations (on the front of the dial if the indicator is on the outside, or on the back of the dial if the indicator is under the dial); a single indicator adapted to be so shifted as to contact with the zero-notch, group gage notches (as of tens of units), or units gage notches, at the will of the operator.

The function of the improvements being to enable the operator to read the gage by the sense of touch or hearing, the combination may be made and used without resort to the sense of sight, if desired.

If the dial is visibly numbered at all, I prefer to number the gage marks each way from zero, as set forth in Letters Patent No. 1,113,865, issued to me October 13, 1914, as this is the method of counting and running any given combination used with my improvements.

Elevations or "ribs", instead of depressions, may be used as gage marks or "graduations".

My invention is illustrated in the accompanying drawings, in which:—

Figure 2:
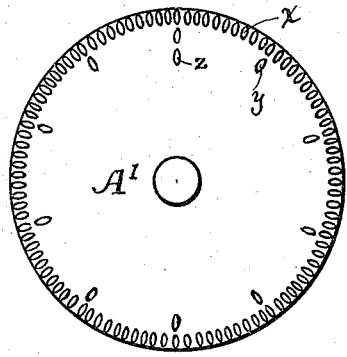
Figure 4:
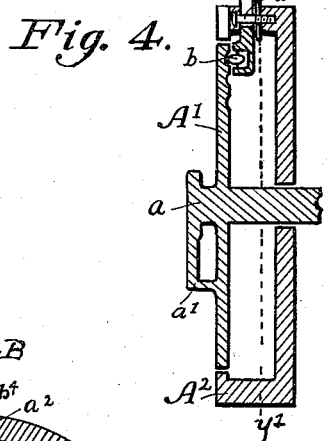
Figure 3:
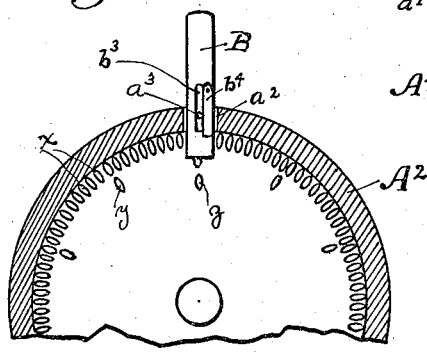
Figure 5:
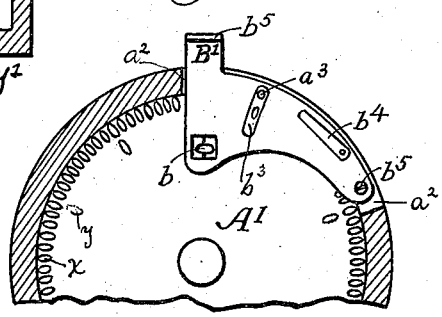

Figure 1 is a plan or face view of the dial structure, in which the special mechanism of my invention is applied to the underside of the rotating dial-plate and therefore is not visible in the figure except the portion of the indicator handle that passes through the dial rim and terminates outwardly for use by the operator; Fig. 2 is a plan view of the underside of the rotating dial plate detached; Fig. 3 is a partial under plan view of the parts in cross-section on the dotted line $y^1$ of Fig. 4; Fig. 4, a cross section of the parts taken on the line $x^1$ of Fig. 1; Fig. 5, a partial cross-section as in Fig. 3, showing a modified form of the indicator.

Referring now to the drawings, $A^1$ is a rotatable lock-dial with the usual knob $a$ and a fin $a^1$ to facilitate accurate rotation; and $A^2$ designates its fixed casing. The visible gage or graduation of the dial for determining entire or fractional revolutions, is of the usual type, except that it is numbered each way from zero, as already indicated.

The dial $A^1$ is provided with three separate series of gage marks or graduations, shown here as notches at the underside of the dial plate, arranged in concentric circles, one within the other. The outer one of these, $x$, indicates single units; those in the next circle, $y$, indicate groups of tens of units; and the inner one is a single notch $z$, which indicates zero, or the starting point in the count, or the completion of an entire revolution from zero.

The indicator mechanism comprises a small wheel $b$ journaled on lugs projecting from the lower end of the lever or handle B, which is slidably set in a slot $a^2$ in the rim $A^2$, and held against displacement and limited as to movement lengthwise of the lever by a stud $a^3$ fixed to the rim $A^2$ and passing through a slot $b^3$ in the lever.

The wheel-end of the lever B is held normally away from contact with the underside of the dial by a spring $b^4$. The slot $b^3$ is of such length and the stud $a^3$ so placed that the wheel $b$ is in position to contact with the zero-notch when the lever B is pushed down or inward into the dial casing toward the knob $a$ as far as possible; and in position to contact with the units-notches when the lever B is pulled outward away from the knob $a$, as far as possible; and at the intermediate position, the indicator wheel will contact with the units group graduations. The wheel $b$ is brought in contact with the dial notches by pressing the outer end of the lever handle B backward, as indicated by the arrow in Fig. 4.

The alternative form of carrier for the indicator wheel $b$, shown in Fig. 5, is a plate $B^1$ formed by providing the thrust element B with a side extension at the end of which it is pivoted as at $b^5$ to the outer rim of the casing, giving the indicator wheel $b$ a movement in the arc of a circle centered at $b^5$,—approximating a straight line. A slot $b^3$ in the plate operating in connection with a pin $a^3$, function as the corresponding parts $b^3$, $a^3$, before described; and a spring $b^4$ secured to the plate and bearing against the side of the extended casing—slot $a^2$ in which the plate moves and is held,—holds the indicator wheel normally in contact with the dial plate.

The mode of operation is simple and will further illustrate the functional advantages of the invention.

If an indicator is used constantly in contact with the dial surface on the circle in which the zero notch is located, as shown in my pending application for Letters Patent of the United States, Serial No. 878,341, then the lever B and wheel $b$ could have their radial movement limited simply to the distance between the units notch circle and the group notch circle.

A point instead of a wheel may be used as an indicator, but I prefer the wheel because the wear is less and no noise will be made loud enough to enable a bystander to observe closely and learn the combination number, although not in position to read it on the dial by sight.

When making entire revolutions, press the lever clear in toward the dial knob and back toward the safe body, when the contact of the wheel with the zero-notch will cause a slight check of movement and sound. The dial may be rotated entirely by the knob $a$ or rotation may be facilitated and made more accurate by the use of the fin $a^1$ also, and the fin is so set as to coincide with the zero notch.

Partial rotations of the dial in either direction are indicated to the sense of touch and hearing, provided the lever B is first moved outward half way if the wheel is to contact with group notches, and all the way if with units-notches. The operator should bear in toward the safe body on the lever handle in the form of the device shown in Figs. 1, 2, 3 and 4. Rotation of the dial in either direction will indicate to touch or hearing the number of notches contacted with by the wheel and render the count easy without the aid of sight.

I claim as my invention and desire to secure by Letters Patent of the United States:

1. In a combination lock, a rotatable dial provided with graduations upon its surface arranged in concentric circles, representing, respectively, single units, uniform groups of units, and the starting point in the count, and an indicator adapted to be adjusted to contact with the surface of the dial at either circle of said graduations, at will.

2. In a combination lock, a chambered dial-casing, a rotatable dial constituting a face plate for the casing-chamber, said dial plate having graduations arranged upon its inner surface in concentric circles for designating single units, uniform groups of units, and a common starting point, respectively, and an indicator arranged within the casing chamber adapted to bear outwardly by manipulation against the inner face of the dial; and a manipulating handle carrying the indicator and extending outwardly through the dial-casing.

In testimony whereof I have hereunto set my hand in presence of two subscribing witnesses.

WILLIAM T. BENHAM.

Witnesses:
 A. L. TILDESLEY,
 HENRY B. STREET.

Copies of this patent may be obtained for five cents each, by addressing the "Commissioner of Patents, Washington, D. C."